(12) United States Patent
Fischer et al.

(10) Patent No.: US 12,286,033 B2
(45) Date of Patent: Apr. 29, 2025

(54) SEAT MONITORING SYSTEM AND METHOD FOR POSITION DETERMINATION

(71) Applicant: Marquardt GmbH, Rietheim-Weilheim (DE)

(72) Inventors: Joerg Fischer, Donaueschingen (DE);
Daniel Hoerr, Oxford, MI (US);
Antoine Bacle, Chauray (FR);
Wolfgang Stehle, Renquishausen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 18/687,027

(22) PCT Filed: Aug. 3, 2022

(86) PCT No.: PCT/EP2022/071851
§ 371 (c)(1),
(2) Date: Feb. 27, 2024

(87) PCT Pub. No.: WO2023/061636
PCT Pub. Date: Apr. 20, 2023

(65) Prior Publication Data
US 2024/0367557 A1    Nov. 7, 2024

(30) Foreign Application Priority Data

Oct. 12, 2021   (DE) .................... 10 2021 126 382.4

(51) Int. Cl.
*B60N 2/00*     (2006.01)
*B60N 2/02*     (2006.01)
(Continued)

(52) U.S. Cl.
CPC ......... *B60N 2/0035* (2023.08); *B60N 2/0244* (2013.01); *B60R 21/01546* (2014.10); *B60N 2210/20* (2023.08); *B60R 2021/01088* (2013.01)

(58) Field of Classification Search
CPC ...... B60N 2/002; B60N 2/242; B60N 2/0035; B60N 2230/20; B60N 2210/20; B60R 2021/01088
See application file for complete search history.

(56) References Cited

U.S. PATENT DOCUMENTS 9,282,530 B1 *   3/2016   Couleaud ............... H04W 72/20
9,491,581 B1 *   11/2016  Dame ..................... H04L 67/52
(Continued)

FOREIGN PATENT DOCUMENTS

DE    102008031494 A1   3/2009
DE    112017005187 T5   7/2019
(Continued)

OTHER PUBLICATIONS

European Patent Office, Rijswijk, Netherlands, International Search Report of International Application No. PCT/EP2022/071851, Mailed Nov. 24, 2022, 2 pages.

*Primary Examiner* — James A English
(74) *Attorney, Agent, or Firm* — Dickinson Wright PLLC

(57) ABSTRACT

A seat monitoring system for monitoring a state of at least one seat arrangeable in a vehicle's interior and determining the position of the seat in the interior. The monitoring system has a control module, two sending modules signally connected to the control module, and at least one seat module associated with at least one seat and a receiving module. The two sending modules are spaced apart from one another and each have one antenna, the receiving module has two antennas. A first antenna of the receiving module is configured to receive a signal from a first sending module of the (Continued)

sending modules, and a second antenna of the receiving module is configured to receive a signal from a second sending module of the sending modules. The receiving module is configured to determine signal strengths of the signals received by the antennas of the receiving module for position determination.

20 Claims, 1 Drawing Sheet

(51) Int. Cl.
*B60R 21/015* (2006.01)
*B60R 21/01* (2006.01)

(56) References Cited

U.S. PATENT DOCUMENTS

| | | | | |
|---|---|---|---|---|
| 2006/0103193 A1* | 5/2006 | Kramer | ............... | B64D 11/06 |
| | | | | 297/217.3 |
| 2007/0268110 A1* | 11/2007 | Little | ............... | B60R 25/24 |
| | | | | 340/5.1 |
| 2016/0080042 A1* | 3/2016 | Thoreux | ............... | H04B 7/02 |
| | | | | 340/1.1 |
| 2023/0113189 A1* | 4/2023 | Muirhead | ............... | H04W 8/26 |
| | | | | 455/134 |

FOREIGN PATENT DOCUMENTS

| | | | |
|---|---|---|---|
| DE | 102021102155 A1 | 8/2021 | |
| DE | 102020107845 A1 | 9/2021 | |
| WO | WO-2021165321 A1 * | 8/2021 | ......... G01S 5/02529 |

* cited by examiner

SEAT MONITORING SYSTEM AND METHOD FOR POSITION DETERMINATION

CROSS REFERENCE TO RELATED APPLICATIONS

This application is a 35 U.S.C. § 371 national phase application of International Application No.: PCT/EP2022/071851, filed Aug. 3, 2022, which claims the benefit of priority under 35 U.S.C. § 119 to German Patent Application No.: 10 2021 126 382.4, filed Oct. 12, 2021, the contents of which are incorporated herein by reference in their entirety.

FIELD

The invention relates to a seat monitoring system for monitoring a state of at least one seat arrangeable in an interior of a vehicle and determining the position of the seat in the interior, as well as to a method for position determination, wherein the seat monitoring system is characterized in particular by using exactly two antennas for monitoring and position determination on the vehicle side and on the seat side, respectively.

BACKGROUND

The statements in this section merely provide background information related to the present disclosure and several definitions for terms used in the present disclosure and may not constitute prior art.

The prior art discloses a number of different conventional systems for seat monitoring. In principle, it is to be assumed that the seats in a vehicle are to be arranged flexibly more and more often in order to be able to provide a wide variety of vehicle interiors adapted to specific tasks.

By way of example only, for transporting goods, all seats are to be removed from a vehicle, for transporting persons, all seats or at least some seats are to be installed in the vehicle and existing seats should be able to be arranged differently, e.g., rotated, depending on the situation.

However, this results in new restrictions regarding cable routing in the vehicle since an interface would have to be provided for wired status monitoring and position detection at every possible point in the vehicle at which a seat is to be arrangeable.

In particular, this also applies with respect to state monitoring of the belts associated with the seats, it being mandatory in modern vehicles to obtain the status thereof (open/closed) along with a seat occupancy.

For this purpose, a wide variety of wireless seat monitoring systems are proposed in the prior art. For example, DE 10 2008 031 494 B4 discloses a seat monitoring system which determines a distance of a transmitter from the receiver from a single signal strength and determines, by comparing the determined distance to the distances between the transmitter and multiple predetermined regions in which a seat is arrangeable, in which of the predetermined regions the seat is arranged.

Furthermore, DE 11 2017 005 187 T5 proposes a seat monitoring system which is configured to determine a position of the seat by determining the distances of the seat from exactly three transmitters (antennas).

In addition to position determination, it is also intended for the seats or seat modules provided on the seats to transmit state values, such as a status of the belt, whether it is closed or open, to a control module provided in the vehicle. For this purpose, however, a sensor module is required in or on the seats, which detects these state values.

SUMMARY

An objective of the present disclosure is to provide an alternative system for seat monitoring, which provides a further possibility for determining the position of the seat in the vehicle.

This objective is achieved by the combination of features associated with a seat monitoring system for monitoring a state of at least one seat arrangeable in an interior of a vehicle and determining the position of the seat in the interior. The seat monitoring system has a control module, exactly two sending modules signally connected to the control module, and at least one seat module which is associated with at least one seat and which has a receiving module. The seat monitoring system is characterized in that the exactly two sending modules are arranged spaced apart from one another and each have exactly one antenna, the receiving module has exactly two antennas. A first antenna of the receiving module is configured to receive a signal from a first sending module of the exactly two sending modules, and a second antenna of the receiving module is configured to receive a signal from a second sending module of the exactly two sending modules. The receiving module is configured to determine signal strengths of the signals received by the antennas of the receiving module for position determination.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings are provided herewith for purely illustrative purposes and are not intended to limit the scope of the present invention. The figures are schematic for illustration. Similar reference numbers in the figures indicate similar functional and/or structural features.

DETAILED DESCRIPTION

Figure 1:
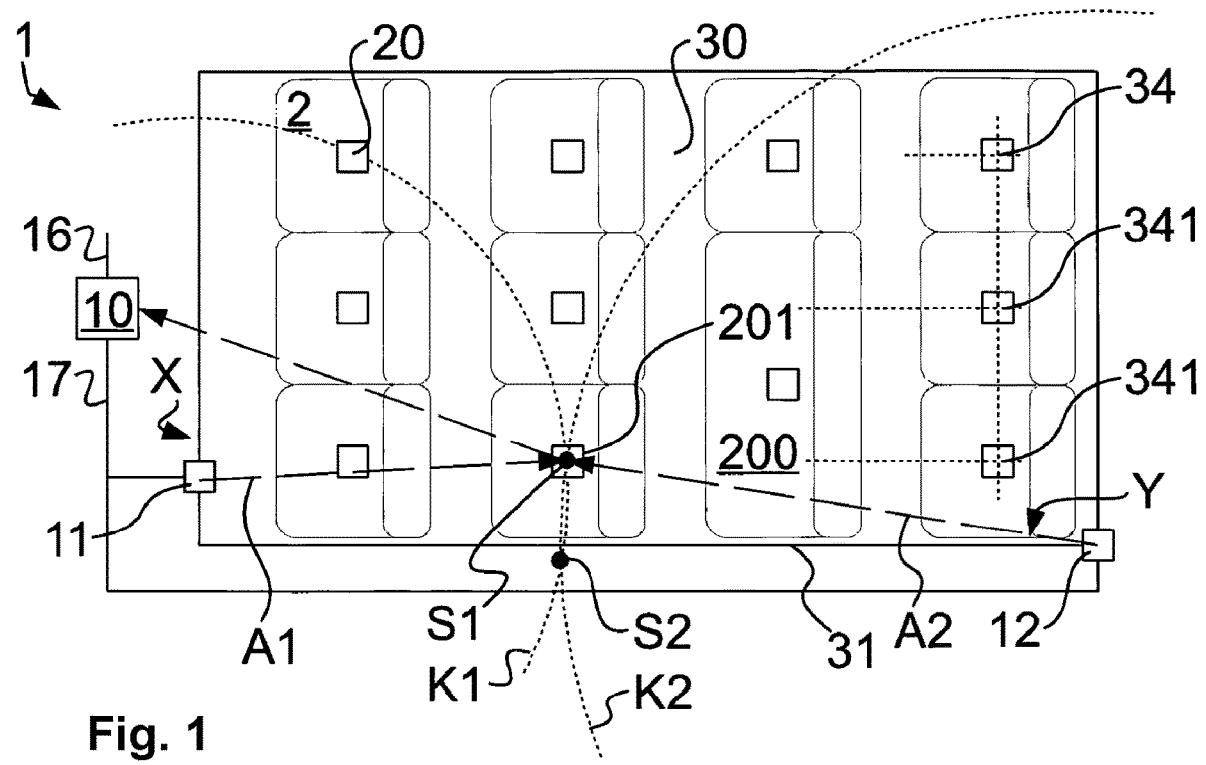
FIG. 1 shows a seat monitoring system in a first seat arrangement.

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The present disclosure relates to a seat monitoring system for monitoring a state of at least one seat arrangeable in an interior of a vehicle and determining the position of the seat in the interior, as well as to a method for position determination, wherein the seat monitoring system is characterized in particular by using exactly two antennas for monitoring and position determination on the vehicle side and on the seat side, respectively. Therefore, according to the invention, a seat monitoring system for monitoring a state of at least one seat arrangeable in an interior of a vehicle and determining the position of the seat in the interior is proposed. As such, the seat monitoring system may be provided, for example, exclusively in the rear of a vehicle or also in the entire interior. However, it is usually sufficient to monitor only the rear of the vehicle as the seats in the front area of the interior, i.e., in particular the driver's and front passenger seat, are usually not to be removed from the vehicle and are often firmly anchored. The seat monitoring system has a control module, exactly two sending modules signally connected to the control module, and at least one seat module. Each of the at least one seat module is associated with at least one seat, wherein, for example, two or more seats may also be connected to form a unit, so that the seat module can then be associated with the unit of seats. The at least one seat module or each seat module has a receiving module and in particular exactly one receiving module. Furthermore, the invention is characterized in that the exactly two sending modules are arranged spaced apart from one another and have exactly one antenna each. Furthermore, the receiving module has exactly two antennas, wherein a first antenna of the exactly two antennas of the receiving module is configured to receive a signal from a first sending module of the exactly two sending modules or of the exactly one antenna of the first sending module, and wherein a second antenna of the exactly two antennas of the receiving module is configured to receive a signal from a second sending module of the exactly two sending modules or of the exactly one antenna of the second sending module. Additionally, the receiving module is configured to determine signal strengths (RSSI) of the signals received by the antennas of the receiving module, i.e., a first signal strength of the signal received by the first antenna of the receiving module from the antenna of the first sending module and a second signal strength of the signal received by the second antenna of the receiving module from the antenna of the second sending module, for position determination.

Preferably, the first antenna of the receiving module is configured, by a corresponding alignment and/or signal filter, for example, to exclusively receive and/or evaluate the signal of the antenna of the first sending module.

Also preferably, the second antenna of the receiving module is configured, by a corresponding alignment and/or signal filter, for example, to exclusively receive and/or evaluate the signal of the antenna of the second sending module.

According to an advantageous development, it is also provided that the receiving module is signally connected to the control module and is configured to send data to the control module. As such, the receiving module can also be configured to send, to the control module, digital information and/or digital data and further, in particular, the information as to whether the seat module is arranged in the interior or, insofar as a region in the interior is determined in which the seats can be arranged, whether the seat module is arranged in the region. Whether the seat module is arranged in the interior or in the region can already be determined, for example, from the receiving module having received a signal each from both sending modules. If, for example, a signal is received from only one of the receiving modules, the information that the seat module is not arranged within the vehicle or the region can be sent to the control module.

The signaling connection may be established, for example, by a bidirectional radio connection via the antennas of the receiving module and the respective antenna of the sending modules. It is also possible that only one radio connection between exactly one antenna of the receiving module and exactly one sending module is bidirectional and the other radio connection is unidirectional.

Alternatively, further antennas which are not used for position determination can also be provided. For example, the exactly two antennas of the receiving module can be AF antennas and an additional antenna of the seat module, which can also be provided outside the receiving module, can be an RF antenna. As such, the antennas of the sending modules are then also configured as AF antennas and an additional antenna signally connected to the control module is configured as an RF antenna. Since neither the additional antenna of the seat module nor the additional antenna connected to the control module are used for position determination, their arrangement in the vehicle is arbitrary and independent of the other antennas.

Preferably, the sending modules and, if present, an additional antenna are signally connected to the control module by means of a cable or wired connection.

In principle, with the proposed seat monitoring system, a distinction can be made between the control module and the sending modules being able to be secured in a fixed, invariable position in the vehicle and thus being associated with the vehicle and the seat module being associated with the at least one seat and being able to be arranged in the vehicle or removed from the vehicle together with the seat.

According to one aspect of the seat monitoring system, the receiving module is configured to transmit the signal strengths of the signals received by the antennas of the receiving module to the control module for position determination. Alternatively or additionally, the receiving module is configured to transmit a position of the seat in the interior of the vehicle to the control module. As such, the position can then be determined by the seat module from the signal strengths of the signals received by the antennas of the receiving module. Alternatively or additionally, the receiving module is configured to transmit a, in particular digital, signal containing a state value to the control module.

In particular, state values are understood to mean a state value of the belt (belt closed/open) which can be referred to as a belt value, an occupancy value (seat occupied, seat not occupied, seat occupied by child seat), a load value (force acting on a seat surface of the seat), an inclination value (inclination of the seat surface and/or of the backrest of the seat), a headrest value (headrest present, not present) and other values relating to the seat. As such, it should be noted that a seat module may also be associated with multiple seats and, correspondingly, multiple equivalent state values may be detected and/or transmitted.

For example, in order to determine such a state value, multiple of such state values or also to determine equivalent state values of multiple seats, it can be provided that the at least one seat module has a sensor module which is configured to determine state values of the at least one seat the seat module is associated with.

Furthermore, it can be provided that the antennas of the exactly two sending modules and/or the exactly two antennas of the receiving module are unidirectional antennas, i.e., antennas transmitting data in only one direction. Additionally or alternatively, it can be provided that the antennas of the exactly two sending modules and/or the exactly two antennas of the receiving module are one-dimensionally sending and/or receiving antennas, wherein, as used herein, one-dimensional is understood to mean that the antennas are configured to send or receive signals substantially only in one direction in space.

According to a further possible variant of the seat monitoring system, the at least one seat is arrangeable in a predetermined and in particular rectangular region in the interior of the vehicle, and the respective position of the exactly two sending modules relative to the region is known and invariable in relation to the region. By determining the distances of the seat module from the sending modules, two points of intersection of circles around the sending modules are obtained in a plane with the respective distance as a radius. If one point of intersection lies outside the predetermined region, this point can immediately be excluded as the position of the seat or it can be concluded that the point of intersection lying within the region corresponds to the position of the seat or of the seat module.

For a further advantageous variant of the seat monitoring system, this means that the respective predetermined position of the sending modules relative to the region is selected such that, of two points of intersection of all possible circles the center of which is one of the sending modules, respectively, one point of intersection lies within the region and one point of intersection lies outside the region.

According to another aspect of the present disclosure, it can be provided that the first sending module is arranged along a first axis and the second sending module is arranged along a second axis which is inclined with respect to the first axis. Preferably, the first axis and the second axis are orthogonal to one another. As such, the axes may delimit the region or be arranged outside the region, for example.

Usually, it is necessary to be able to mechanically secure the seats in the vehicle so that they are arranged releasably but, for the duration for which they are secured, in a stationary manner in the vehicle at least with the interface provided for this purpose. To this end, an advantageous development provides that the at least one seat has a seat base as an interface to the vehicle for releasably securing the seat in the vehicle. The seat module further has a predetermined position which is stationary relative to the seat base, so that the seat module of a seat arranged in the region is arranged in a predetermined plane. If this relative position of the seat module with respect to the seat base or the plane and the positions of the sending modules are known to the module performing the position determination, i.e., the seat module and/or the control module, the position of the seat module relative to the sending modules can be determined more accurately, since any difference between the position of the sending modules and the position of the seat module along the vertical axis of the vehicle can be taken into account.

Furthermore, according to another aspect of the present disclosure, it is provided that the at least one seat is arrangeable or releasably securable in the region on a predetermined grid having mechanical latching points and/or on at least one rail aligned with the predetermined grid.

This grid and/or the path of the at least one rail on the grid, as the case may be, can also be taken into account in position determination to thereby be able to determine the position with greater accuracy and to determine additional information at the same time.

Preferably, the at least one seat module and/or the control module are configured to determine a respective distance of the at least one seat module from the sending modules from the signal strengths of the signals received by the antennas of the receiving module and to determine the position of the seat module in the vehicle from the distances.

If the grid or the positions of the latching points and/or the path and the positioning of the rails are known, it can also be provided that the at least one seat module and/or the control module is/are configured to determine a respective distance of the at least one seat module from the sending modules from the signal strengths of the signals received by the antennas of the receiving module and to determine the position of the seat module and in particular an orientation of the seat associated with the seat module in the vehicle from the distances as well as from the predetermined grid, wherein additional information can further be determined from a deviation of a position of the seat module from the grid.

For a better understanding, the following examples are provided:

If the position determined on the basis of the signal strengths slightly deviates from a latching point or a path of a rail, it can be assumed that the associated seat is arranged at the latching point or on the rail.

If it is assumed that the position determined on the basis of the signal strength is sufficiently accurate, a rotation and/or orientation of the seat around the latching point can be determined from a deviation from a (closest and thus associated) latching point.

If a seat module is associated with exactly one seat and is arranged on the seat such that it always lies on a latching point, for a position determined from the signal strengths and lying on a latching point, it can be assumed that the seat module is associated with exactly one seat. However, if, for example, a further seat module is associated with exactly two seats and is arranged on the two seats such that it is always offset from a latching point by a previously known offset, for a position determined from the signal strengths and the resulting offset to the closest latching point, it can be assumed that the seat module is associated with two seats, and whether the seats are facing the front of the vehicle or the rear of the vehicle, for example. As such, this does not require any additional sensors as these values, which are understood as state values, can be determined directly from a deviation of the determined position from the grid.

Usually, it can also be provided that only some of the seats are configured to be arrangeable in the interior of the vehicle or removable therefrom. In particular, the driver's seat can be fixedly mounted in the interior. As such, however, the driver's seat can also be arranged within the region and have a seat module, so that the position determination can be calibrated with the seat module associated therewith on the basis of the previously known and fixed position of the driver's seat.

A further aspect of the present disclosure relates to a method for determining a position of a seat in an interior of a vehicle having a seat monitoring system according to the invention. As such, it is provided that a first distance of the seat module from the first sending module and a second distance of the seat module from the second sending module are calculated from the signal strengths (RSSI) of the signals received by the exactly two antennas of the receiving module. Subsequently, from the first distance and the second distance, possible positions of the seat module, in particular those lying in a predetermined plane, are determined. If more than one position is possible, impossible positions may be excluded or a single correct position may be concluded taking into account additional information. As such, a position within the vehicle is understood to be the correct or only correct position. It is possible to determine the actual position by taking into account a predetermined region in which the seats are arrangeable. Additionally or alternatively, a grid can be taken into account on which the seats are arrangeable. Furthermore, additionally or alternatively, a predetermined sending direction of the antennas of the sending modules and/or a predetermined receiving direction of the antennas of the receiving module can be taken into account.

The features disclosed above can be used in any combination, as far as this is technically feasible and they do not contradict each other.

Other aspects of the present disclosure are shown in further detail below along with the description of a preferred embodiment with reference to the figures.

Figure 2:
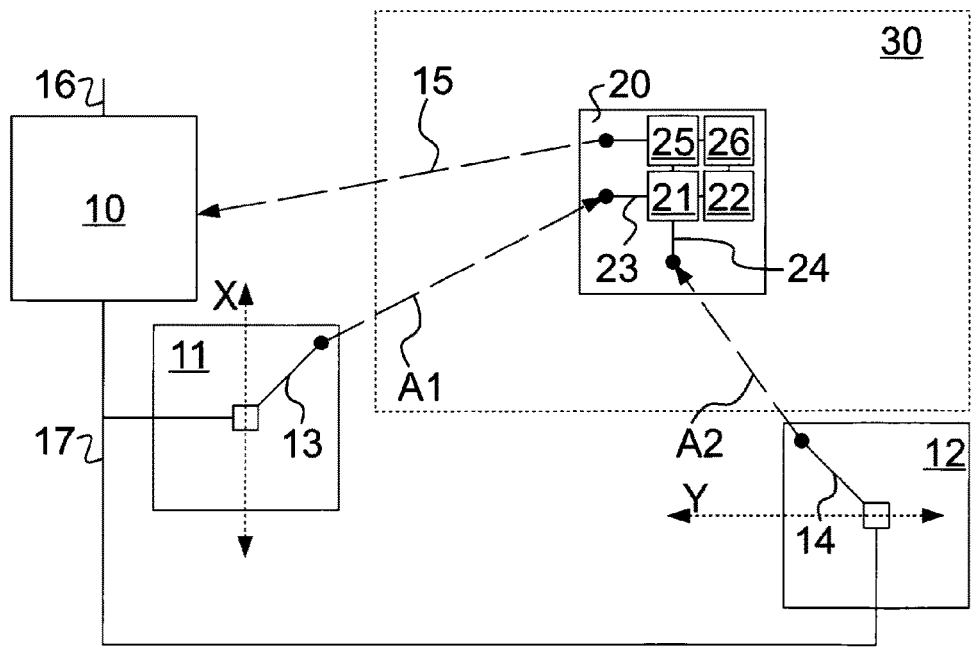
FIG. 2 shows a seat monitoring system in a simplified diagram.

FIGS. 1 and 2 each show a seat monitoring system 1 for monitoring a state of at least one seat 2 arrangeable in an interior and more specifically in a region 30 in the interior of a vehicle and determining the position of the seat 2 in the interior or in the region 30. As such, FIG. 1 corresponds to a plan view of a possible seat monitoring system 1 and FIG. 2 corresponds to a further schematic diagram of a seat monitoring system 1, which may also be the seat monitoring system 1 according to FIG. 1.

The seat monitoring system 1 has a control module 10 integrated with the vehicle and exactly two sending modules 11, 12 signally connected to the control module 10 by means of a physical line 17, for example. Relative to the region 30, the sending modules 11, 12 are arranged in a predetermined position in a stationary manner, and are arranged herein each along an axis X, Y delimiting the rectangular region 30 and orthogonally relative to one another.

Furthermore, the seat monitoring system 1 has at least one seat module 20, wherein the number of seat modules 20 corresponds to the number of seats 2 arranged in the vehicle or the number of seat units 200, which may be formed from multiple seats 2. Accordingly, each seat module 20 is associated with at least one seat 2. As shown in FIG. 1, a seat module 20 is associated with a seat unit or seat group 200 of two seats 2 connected to one another.

Furthermore, each seat module 20 has a receiving module 21, as shown in FIG. 2. The exactly two sending modules 11, 12 are arranged spaced apart from one another and each have exactly one antenna 13, 14 shown in FIG. 2.

Each receiving module 21 of each seat module 20 also has exactly two antennas 23, 24, wherein a first antenna 23 of the receiving module 21 is configured to receive a signal from a first sending module 11 of the exactly two sending modules 11, 12, and a second antenna 24 of the receiving module 21 is configured to receive a signal from a second sending module 12 of the exactly two sending modules 11, 12.

The receiving module 21 is configured to determine signal strengths of the signals received by the antennas 23, 24 of the receiving module 21 for position determination.

Accordingly, the distance A1, A2 of the receiving module 21 from the two sending modules 11, 12 can be determined from the signal strengths (RSSI). Since the receiving module 21 or the seat module 20 cannot be located in space arbitrarily, but is always arranged in a specific plane which extends, for example, parallel to the floor of the vehicle, it is possible to infer, from the distances, two possible positions of the seat module 20 relative to the sending modules 11, 12.

As such, a first distance A1 corresponds to the distance of the receiving module 21 from the first sending module 11 in the plane and a second distance A2 corresponds to the distance of the receiving module 21 from the second sending module 12 in the plane.

When assuming that a first circle K1 has a radius corresponding to the distance A1 and its center in the first sending module 11 and a second circle K2 has a radius corresponding to the distance A2 and its center in the second sending module 12, in the special case in which the distances A1, A2 are identical, exactly one point of intersection is obtained, which then corresponds to the position of the seat module 20. If the distances A1, A2 are not identical, exactly two points of intersection S1, S2 of the circles K1, K2 are always obtained in the plane, wherein both points of intersection S1, S2 can be the position of the seat module 20 relative to the sending modules 11, 12.

As such, however, due to the arrangement selected here of the sending modules 11, 12 relative to the region 30, one of the two points of intersection S1, S2 lies within the region 30 and the other point of intersection lies outside the region 30, so that it can be concluded directly that the point of intersection lying within the region 30 corresponds to the position of the seat module 20.

From this position of the seat module 20, a position relative to any selectable coordinate system can be inferred by means of a corresponding conversion.

Furthermore, such a conversion can be supplemented by a grid 34 on which the seats 2 are arrangeable, in order to increase the accuracy of the position or to obtain additional information about the seat 2.

As such, it can be assumed that the seats 2 or the seat units are mechanically fixed in the vehicle and a grid is provided in the vehicle for this purpose, which can have latching points or latching rails, for example.

If the position of the seat module 20 on a seat 2 relative to a latching point or the grid 34 to which the seat 2 is fastened is known, this deviation can be determined and further information can be generated therefrom.

As shown in FIG. 1, it is provided for the seat unit 200 that the seat module 20 is arranged in the center of the seat unit 200 in the vertical direction as seen in the diagram. Accordingly, the position of the seat module 20 of the seat unit 200 is located exactly between two horizontally extending latching planes 341 of the grid 34 and not, as with individual seats 2, exactly on a horizontally extending latching plane 341 of the grid 34, so that it can be directly determined from the position that it is not a seat module 20 of an individual seat 2 but a seat module 20 of a seat unit 200.

The determination of the distances A1, A2 and the determination of the position of the seat module 20 can be performed by the seat module 20 itself and, for example, by a corresponding computing unit 26 of the seat module 20. Subsequently, the position thus determined can be sent to the control module 10 via a feedback channel. As shown in FIG. 2, the feedback channel may be accomplished by a separate radio connection 15 for unidirectional or bidirectional data transmission, for which the seat module 20 can have an RF antenna 25, for example.

Alternatively, the distances A1, A2 or only the signal strengths can be sent from the seat module 20 to the control module 10 and the position of the seat module 20 can be determined by the control module.

Furthermore, the control module 10 can have an interface 16 for data transmission to further control devices of the vehicle or can be connected thereto via a CAN bus.

What is claimed is:

1. A seat monitoring system for monitoring a state of at least one seat arrangeable in an interior of a vehicle and determining a position of the seat in the interior,
wherein the seat monitoring system has a control module, exactly two sending modules signally connected to the control module, and at least one seat module which is associated with the at least one seat and which has a receiving module,
wherein the exactly two sending modules are arranged spaced apart from one another and each have exactly one antenna,
wherein the receiving module has exactly two antennas, wherein a first antenna of the receiving module is configured to receive a signal from a first sending module of the exactly two sending modules, and a second antenna of the receiving module is configured to receive a signal from a second sending module of the exactly two sending modules,
wherein the receiving module is configured to determine signal strengths of the signals received by the antennas of the receiving module for position determination.

2. The seat monitoring system according to claim 1, wherein the receiving module is signally connected to the control module and is configured to send data to the control module.

3. The seat monitoring system according to claim 2, wherein the receiving module is configured to transmit the signal strengths of the signals received by the antennas of the receiving module to the control module for position determination, and/or transmit a position of the seat in the interior to the control module, which is determinable by the seat module from the signal strengths of the signals received by the antennas of the receiving module, and/or transmit a signal containing state values to the control module.

4. The seat monitoring system according to claim 1, wherein the at least one seat module has a sensor module which is configured to determine state values of the at least one seat the seat module is associated with.

5. The seat monitoring system according to claim 1, wherein the antennas of the exactly two sending modules and/or the exactly two antennas of the receiving module are unidirectional antennas with the antennas of the exactly two sending modules being configured as sending antennas and the exactly two antennas of the receiving module being configured as receiving antennas.

6. The seat monitoring system according to claim 1, wherein the at least one seat is arrangeable in a predetermined region in the interior of the vehicle and the respective position of the exactly two sending modules relative to the region is known and invariable.

7. The seat monitoring system according to claim 6, wherein the respective predetermined position of the sending modules is selected such that, of two points of intersection S1, S2 of all possible circles K1, K2, the center of which is one of the sending modules, respectively, a first point of intersection S1 lies within the region and a second point of intersection S2 lies outside the region.

8. The seat monitoring system according to claim 7, wherein the first sending module is arranged along a first axis X and the second sending module is arranged along a second axis Y which is inclined with respect to the first axis X.

9. The seat monitoring system according to claim 6, wherein the at least one seat has a seat base for releasably securing the seat in the vehicle,
wherein the seat module further has a predetermined position which is stationary relative to the seat base, so that the seat module of a seat arranged in the region is arranged in a predetermined plane.

10. The seat monitoring system according to claim 6, wherein the at least one seat is arrangeable in the region on a predetermined grid having mechanical latching points and/or on at least one rail aligned with the predetermined grid.

11. The seat monitoring system according to claim 1, wherein the at least one seat module and/or the control module is/are configured to determine a respective distance A1, A2 of the at least one seat module from the sending modules from the signal strengths of the signals received by the antennas of the receiving module and to determine the position of the seat module in the vehicle from the distances A1, A2.

12. The seat monitoring system according to claim 10, wherein the at least one seat module and/or the control module is/are configured to determine a respective distance A1, A2 of the at least one seat module to the sending modules from the signal strengths of the signals received by the antennas of the receiving module and to determine the position of the seat module.

13. A method for determining a position of a seat in an interior of a vehicle, having a seat monitoring system according to claim 1,
wherein a first distance A1 of the seat module from the first sending module and a second distance A2 of the seat module from the second sending module are calculated from the signal strengths of the signals received by the exactly two antennas of the receiving module,
wherein possible positions of the seat module are determined from the first distance A1 and the second distance A2,
and wherein, by means of a predetermined area in which the seats are arrangeable,
and/or by means of a grid on which the seats are arrangeable,
and/or by means of a predetermined sending direction of the antennas of the sending modules,
and/or by means of a predetermined receiving direction of the antennas of the receiving module, an actual position of the seat module is determined from the possible positions.

14. The seat monitoring system according to claim 3, wherein the at least one seat module has a sensor module which is configured to determine state values of the at least one seat the seat module is associated with.

15. The seat monitoring system according to claim 14, wherein the antennas of the exactly two sending modules and/or the exactly two antennas of the receiving module are unidirectional antennas with the antennas of the exactly two sending modules being configured as sending antennas and the exactly two antennas of the receiving module being configured as receiving antennas.

16. The seat monitoring system according to claim 15, wherein the at least one seat is arrangeable in a predetermined region in the interior of the vehicle and the respective position of the exactly two sending modules relative to the region is known and invariable.

17. The seat monitoring system according to claim 8, wherein the at least one seat has a seat base for releasably securing the seat in the vehicle,
wherein the seat module further has a predetermined position which is stationary relative to the seat base, so that the seat module of a seat arranged in the region is arranged in a predetermined plane.

18. The seat monitoring system according to claim 17, wherein the at least one seat is arrangeable in the region on a predetermined grid having mechanical latching points and/or on at least one rail aligned with the predetermined grid.

19. The seat monitoring system according to claim 18, wherein the at least one seat module and/or the control module is/are configured to determine a respective distance $A_1$, $A_2$ of the at least one seat module from the sending modules from the signal strengths of the signals received by the antennas of the receiving module and to determine the position of the seat module in the vehicle from the distances $A_1$, $A_2$.

20. The seat monitoring system according to claim 19, wherein the at least one seat module and/or the control module is/are configured to determine a respective distance $A_1$, $A_2$ of the at least one seat module to the sending modules from the signal strengths of the signals received by the antennas of the receiving module and to determine the position of the seat module.

\* \* \* \* \*